United States Patent [19]
Mitchell et al.

[11] 4,058,823
[45] Nov. 15, 1977

[54] CAMERA ACCESSORY AND CARTRIDGE

[75] Inventors: Roger Mitchell, Minneapolis; William H. Strater, Bloomington, both of Minn.

[73] Assignee: Visual Graphics Corporation, New York, N.Y.

[21] Appl. No.: 674,824

[22] Filed: Apr. 8, 1976

[51] Int. Cl.² ............................................. G03B 17/26
[52] U.S. Cl. ................................. 354/354; 354/275; 242/71.8; 206/410
[58] Field of Search ............... 354/275, 277, 307, 310, 354/312, 313, 354; 242/68.1, 71.1, 71.8; 206/316, 397, 398, 400, 410, 454

[56] References Cited

U.S. PATENT DOCUMENTS

| | | | |
|---|---|---|---|
| 1,243,403 | 10/1917 | Hanlon | 354/310 |
| 2,119,300 | 5/1938 | Spanel | 206/410 |
| 2,341,333 | 2/1944 | Purinton | 242/71.8 |
| 2,420,719 | 5/1947 | Park | 354/277 |
| 2,476,928 | 7/1949 | Thomas | 242/71.8 A |
| 3,348,042 | 10/1967 | Umberg et al. | 206/454 |
| 3,850,294 | 11/1974 | Phillips et al. | 206/410 |

Primary Examiner—L. T. Hix
Assistant Examiner—Alan Mathews
Attorney, Agent, or Firm—Albert F. Kronman

[57] ABSTRACT

A camera accessory to receive a cartridge of photosensitive material and direct the said photosensitive material into a camera. A light-tight enclosure having a door therein permits the cartridge to be introduced into the interior of the accessory. The cartridge is provided with a hollow core upon which the photosensitive material is wound. A light-tight bag of plastic material overlies the photosensitive material. After the cartridge is placed within the enclosure and the door closed, an elongated plunger operable from without the enclosure and extending through the door urges the bag into the hollow core thereby uncovering the photosensitive materials for subsequent feeding into a camera.

8 Claims, 5 Drawing Figures

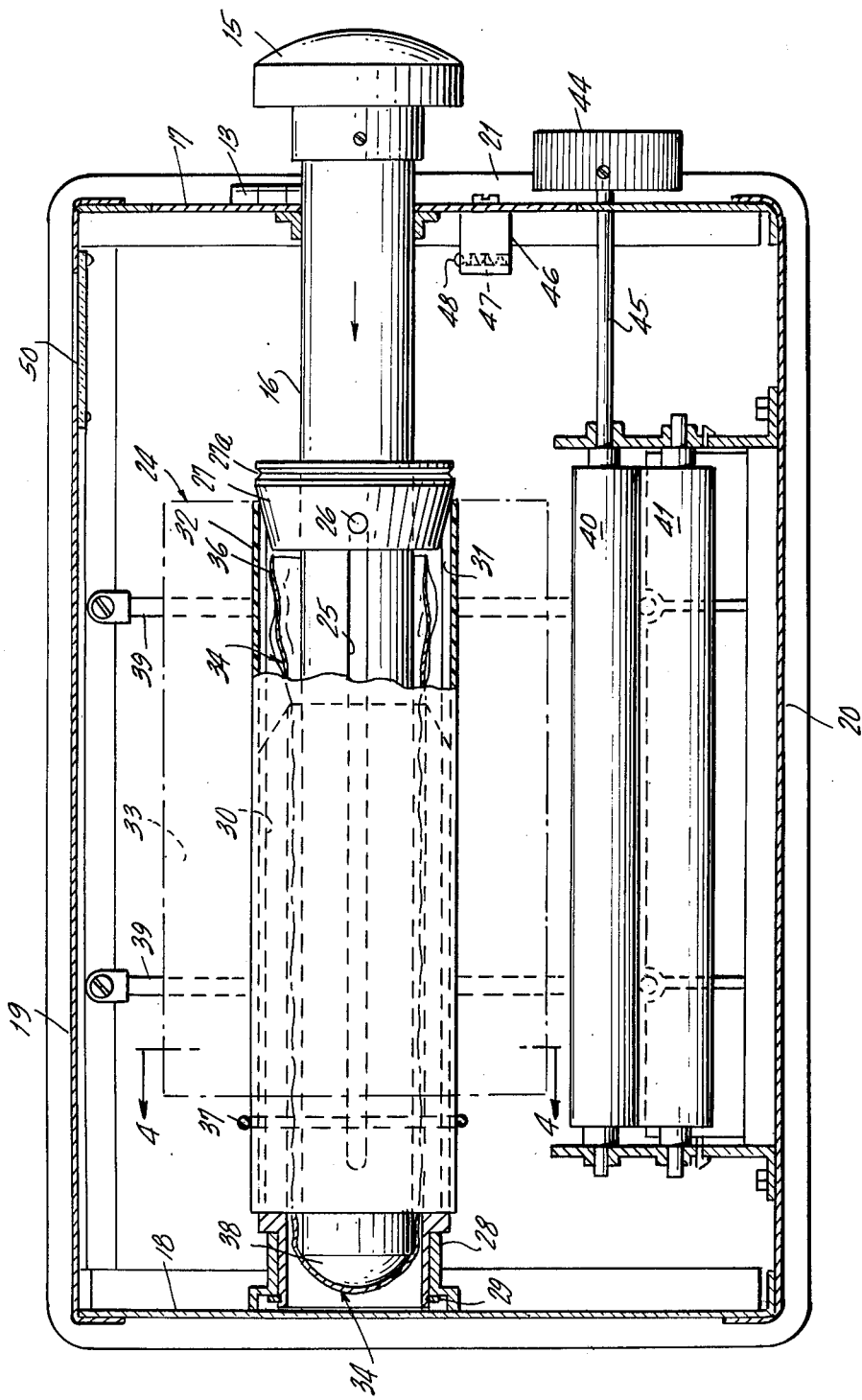

CAMERA ACCESSORY AND CARTRIDGE

BACKGROUND OF THE INVENTION

The problem of leading photosensitive material such as rolls of film or paper into cameras has been solved in many ways such as the use of metal casettes with light traps through which a leader extends; the use of several turns of opaque paper wrapped around the photosensitive material and secured to the leading edge thereof; and various film loading bags with or without safe light windows.

In large commercial cameras particularly where the film is in roll form and color sensitive photographic material is involved, the camera often has to be loaded in total darkness or by the use of very expensive heavy casettes.

Accordingly, it is an object of the present invention to provide a daylight loading camera accessory which will accept large cartridges of film or paper.

Another object of the present invention is to provide a camera accessory which provides easy access to its interior for loading and unloading purposes.

A further object of the present invention is to provide a camera accessory in which the light-tight cartridge cover can be stripped off and stored within a convenient place after the cartridge has been placed within the accessory and the interior of the accessory made light-tight.

A feature of the present invention is its novel cartridge structure which cooperates with the accessory to facilitate day-light operation of the said accessory.

SUMMARY

In a preferred embodiment of the present invention a light-tight housing is provided with a door on the front thereof. The door gives access to the interior of the housing which is provided with a hollow mandrel extending in the direction of the door.

A cartridge having a hollow core and a supply of photosensitive material such as coated film or paper is slipped upon the mandrel. A plastic bag of light impervious material overlies the photosensitive material and is secured at its open end to the core by a resilient fastener such as a rubber band or garter spring.

The housing door is provided with an elongated plunger slidable through a light-tight opening in the door and communicating with the interior of the cartridge core. The plunger is pulled out to the limit of its travel before the cartridge is placed on the mandrel. After the door is closed, the plunger is pushed into the hollow core thereby urging the light-tight bag into the said hollow core and freeing the photosensitive material for movement into a camera.

DESCRIPTION OF THE DRAWINGS

In the accompanying drawings forming part hereof, similar parts have been given the same reference numerals, in which drawings:

FIG. 3 is a view similar to FIG. 2 showing the cartridge in the operative mode.

GENERAL DESCRIPTION

Figure 1:
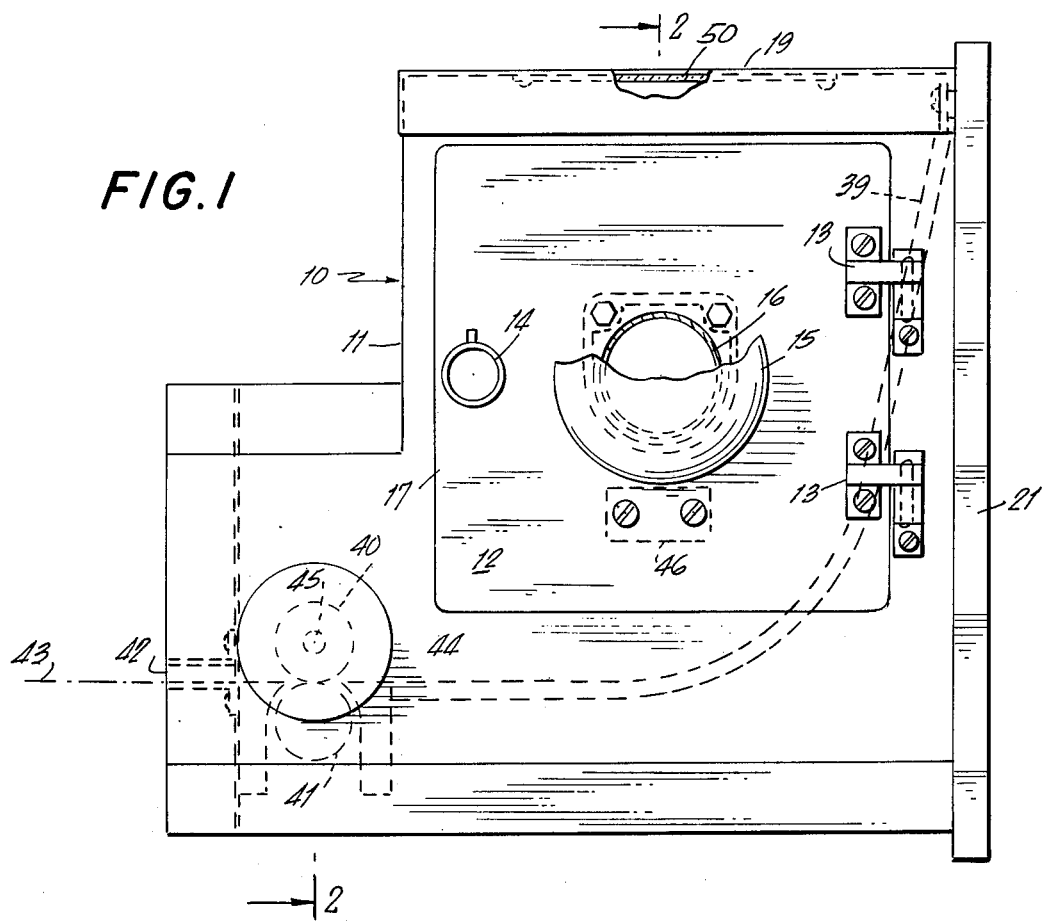
FIG. 1 is a view in front elevation of the present invention with certain parts broken away and indicated in dashed lines.

Referring to the drawings and particularly to FIG. 1, 10 indicates a camera accessory made in accordance with the present invention having a light tight enclosure 11 fitted with a door 12. The door is secured by hinges 13 to the enclosure 11 and provided with a lock 14 to prevent accidental opening of the said door. Extending outwardly of the door 12 is a knob 15 which is secured to a plunger 16 (best shown in FIGS. 2 and 3). The plunger 16 extends through the door and into the interior of the enclosure 11.

Figure 2:
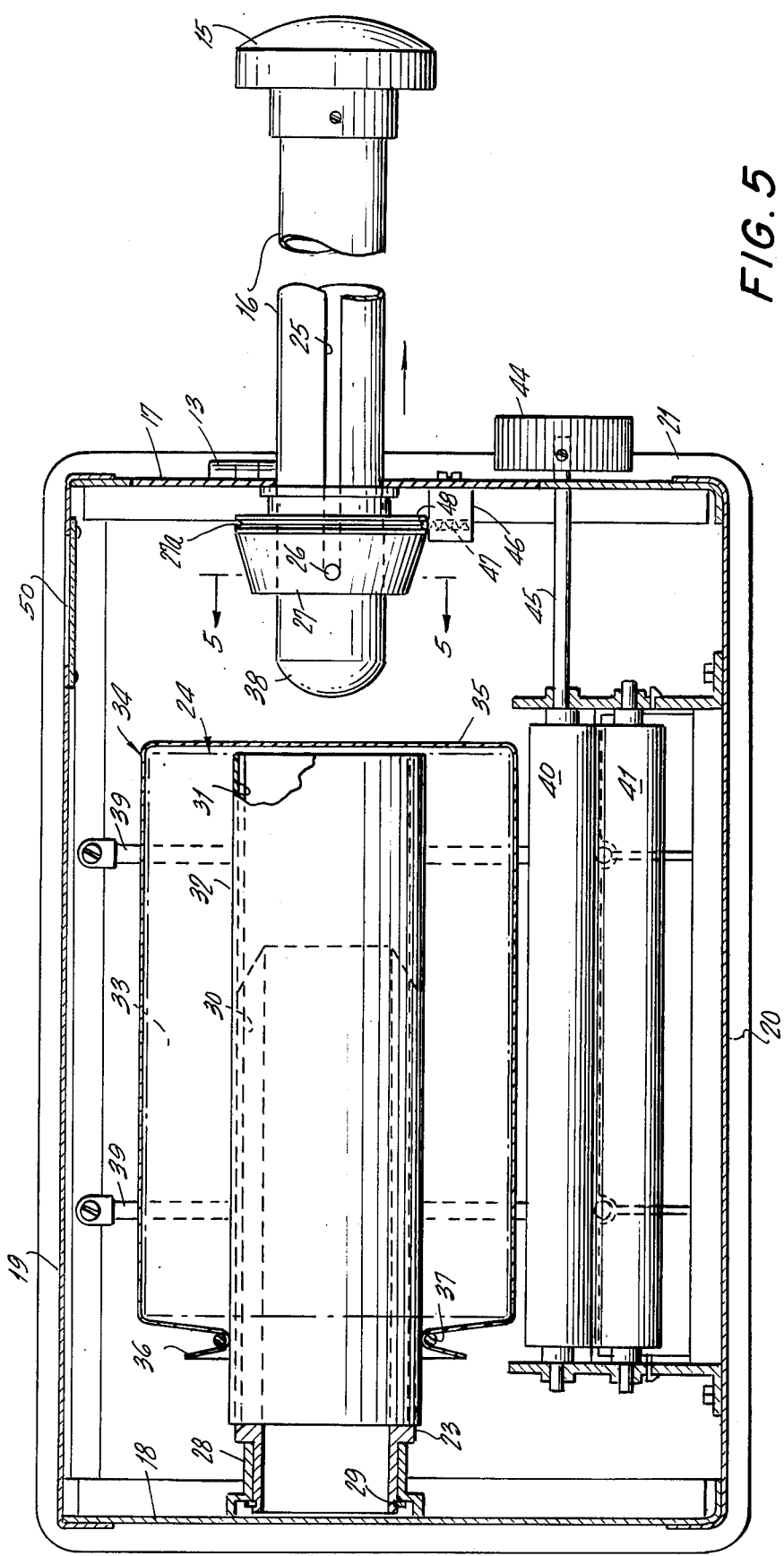
FIG. 2 is a cross sectional view taken on line 2—2 in FIG. 1.
Figure 5:
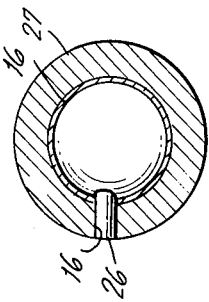
FIG. 5 is a view taken on line 5—5 in FIG. 2 looking in the direction of the arrows.

It will be seen from an examination of FIGS. 1 and 2, that the light tight enclosure, is somewhat box shaped having a front wall 17 a rear wall 18, a top and bottom wall 19, 20, a side wall 21 and an opposed stepped side wall 22. The door 12 is secured to the front wall 17.

A mandrel 23 is secured at one end to the rear wall 18 and extends inwardly therefrom and coaxially with the plunger 16. The mandrel is hollow and of an internal diameter that will receive the plunger 16 freely therein. The mandrel 23 further serves as a support for a cartridge 24, hereinafter more fully described.

Referring to FIGS. 2 and 3, it will be seen that the plunger 16 is formed with an elongated slot 25 to receive a pin 26. The pin 26 is carried by a plug 27 slideably received upon the plunger 16 within the enclosure 11. The slot 25 acts as a lost motion device to permit the plunger 16 to travel from the position shown in FIG. 2 to that shown in FIG. 3 while the plug 27 travels the shorter distance shown in the two figures.

The plug 27 is provided with a peripheral groove 27A to receive a spring loaded ball detent 48. The ball detent is carried within a block 46 secured to the door 12. A spring 47 carried within the block 46 urges the ball detent in the direction of the peripheral groove 27A. When the plunger 16 is pulled out to the limit of its travel the plug 27 is engaged by the ball detent 48 in the manner shown in FIG. 2. When the plunger 16 is slid inwardly to engage the end of the bag 34 the lost motion slot 25 permits the plug 27 to remain stationary upon the ball detent 48 until the pin 26 strikes the outer end of the slot 25. Thereafter, the plug 27 is advanced into the position shown in FIG. 3 to support the end of the core 32 and also provide frictional contact with the said core thereby acting as a clutch to prevent undesired rotation of the core which might release excessive amounts of the photosensitive material therefrom.

Where photosensitive material other than color responsive coatings, such as color film, are used in the accessory a safe light filter 50, best shown in FIG. 1, in the nature of a filter plate may be provided in the top 19 of the accessory. Alternately, a cover (not shown) may be employed when color sensitive material is used.

Figure 4:
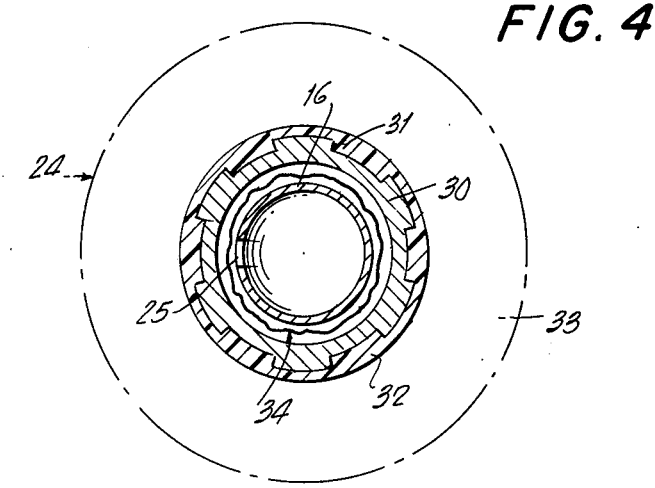
FIG. 4 is a view taken on line 4—4 in FIG. 3 looking in the direction of the arrows.

It will be seen, from an examination of FIGS. 2 and 4, that the mandrel 23, is journaled within a bushing 28, secured to the inner surface of the rear wall 18. A washer 29 secures the mandrel 23 in place and permits it to rotate within the bushing 28. Splines 30 (best shown in FIG. 4) are formed in the outer surface of the mandrel 23 and are adapted to receive complementary splines 31 in the core 32 of the cartridge 24. In this manner, the cartridge 24 can not rotate independently of the mandrel 23 and a certain amount of drag can be imparted to the cartridge 24 to prevent the photosensitive material 33 from uncontrolled unwinding. It is to be understood that by term photosensitive material there is meant to include paper, plastic, or metal support strips having a photosensitive layer thereon.

The cartridge 24 as best shown in FIG. 2, is provided with a covering 34 in the nature of a light impervious bag closed at one end 35 and opened at its other end 36. The core 32 of the cartridge 24 is hollow and extends a short distance beyond the photosensitive material 33.

When the cartridge 24 is loaded with photosensitive material, the said material is wound upon the core 32 for a desired length. The light impervious bag 34 made of a suitable plastic such as Mylar, vinyl, polyethelyne or the like is then slipped over the photosensitive material in the manner shown in FIG. 2 and the open end 36 of the bag 34 sealed from ambient light by means of a resilient member 37. The resilient member 37 may be a rubber band, a garter spring, or any other suitable device which will prevent light from leaking into the cartridge prior to its insertion in the light tight enclosure 11.

When it is desired to load the camera accessory 10 the plunger 16 is pulled out to the limit of its travel by the knob 15. The door 12 is then swung open to give access to the interior of the enclosure 11. The cartridge 24 is next slipped into the interior of the enclosure in the manner shown in FIG. 2 and upon the mandrel 23. The door 12 is then swung shut and the plunger 16 advanced into the enclosure 11 until it reaches the position shown in FIG. 3. As the rounded end 38 of the plunger 16 reaches the closed end 35 of the bag 34 it contacts the said bag end and slowly forces it into the space formed by the interior of the core 32 and the mandrel 23, as best shown in FIG. 3. As the bag 34 is pressed inwardly by the plunger 16, the open end 36 of the said bag is pulled free of the resilient member 37 and thereby released. The light impervious bag 34 is thereby disposed of within the light tight housing without fear of having the photosensitive material become light struck. Moreover, the bag 34 is out of the way of the operating mechanism of the accessory and will be withdrawn from the accessory when the empty core of the cartridge is removed following the exposure of the photosensitive material.

With the cartridge uncovered in the manner above described, the leading edge of the photosensitive material can be directed downwardly by the guide strips 39 which extend downwardly from the interior of the top wall 19 and lead to the nip of rollers 40, 41. The knob 15 may be rotated to move the photosensitive material in the desired direction. The rollers 40, 41, are placed adjacent an exit slit 42 for the photosensitive material 33. The exit slit 42 can be provided with a light trap in the well-known manner. On the other hand, the rollers 40, 41 can be so positioned as to prevent light from coming through the slit, if desired. Where the accessory is secured to a camera (not shown) there is no danger of light entering the light slit 42. The photosensitive material 33 can leave the accessory through the slit 42 and be transported onto the film plane 43 of the said camera.

As shown in FIGS. 2 and 3, the rollers 40, 41 can be rotated by means of a controlled knob 44 which is disposed on the front wall on the accessory and is secured to a shaft 45. The shaft 45 is elongated and provides the support for the roller 40. Since the rollers are made of resilient material and are in frictional contact, rotation of the control knob 44 will cause them to turn in opposite directions to feed the photosensitive material out of the enclosure 11.

It will be apparent that in unloading the camera accessory, following the use of all the photosensitive material, it is merely necessary to pull the plunger 15 outwardly until it is in the position shown in FIG. 2, open the door 12 and thereafter reach into the enclosure 11 and slip the empty core 32 off the mandrel 23 taking the bag 34 with the said core. The camera accessory 10 is then ready for subsequent loading and reuse.

From the foregoing it will be seen that there has been provided a simplified daylight loading camera accessory and cartridge structure which is economical of construction, easy to operate, and lends itself to a wide variety of camera uses.

Having thus fully described the invention what is claimed as new and desired to be secured by Letters Patent is:

1. A camera accessory and cartridge comprising a light-tight enclosure, an access door on said enclosure, an elongated plunger carried by the door and slideable therethrough from the exterior to the interior of said enclosure, a hollow mandrel secured within the enclosure and extending in the direction of the access door and coaxial with the plunger, a cartridge comprising a hollow core, a supply of photosensitive material carried upon the core, a light impervious bag having a closed and an open end overlying the said light impervious material, means to secure the open end of the bag to the core in light-tight contact with said core, said cartridge being slideably received upon said mandrel, and means within the housing to advance the photo-sensitive material through an exit slot in the light-tight enclosure.

2. A camera accessory according to claim 1 in which the light-tight enclosure is provided with front, rear, top, bottom and side walls, the door is secured to the front wall and the mandrel is secured to the rear wall.

3. A camera accessory according to claim 1 in which the plunger is of an outside diameter which will be freely received within the cartridge core and the hollow mandrel.

4. A camera accessory according to claim 1 in which the plunger is provided with a plug slideably carried upon the plunger for limited movement into and out of engagement with the adjacent end of the cartridge.

5. A camera accessory according to claim 4 in which the plug is coupled to the plunger by means of a lost motion slot and a pin carried by the plunger and received in said slot.

6. A camera accessory according to claim 1 in which the plunger has a longitudinal travel of a length which will substantially dispose the bag within the cartridge core.

7. A camera accessory according to claim 1 in which the photosensitive material advancing means comprises a knob secured to the plunger on the exterior end thereof, a pair of rollers to receive the photosensitive material, a control knob operatively coupled to the rollers and guide strips between the cartridge and the said rollers.

8. A camera accessory according to claim 1 in which the mandrel is freely journaled within a bushing secured to the interior of the container.

* * * * *